(No Model.)
H. BURRITT.
HOE.
No. 470,981. Patented Mar. 15, 1892.
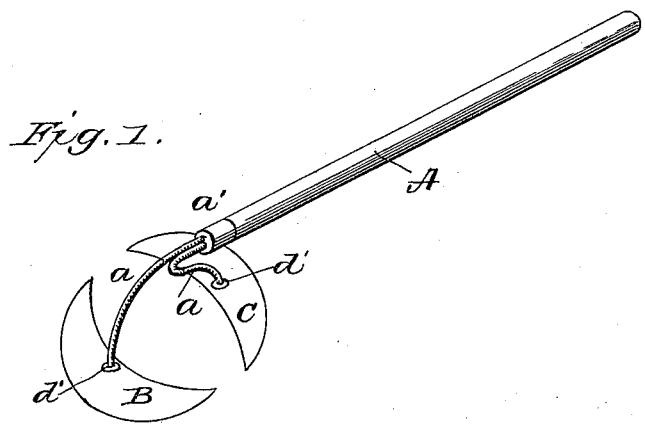
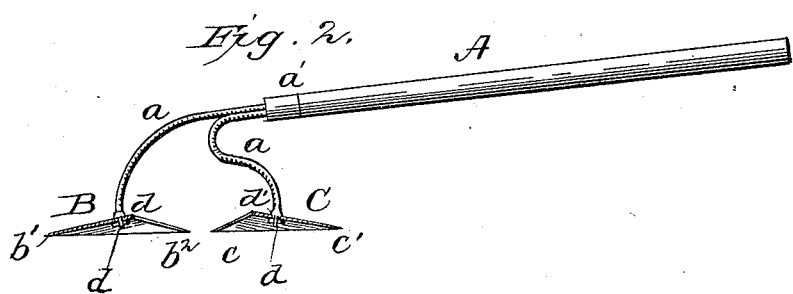
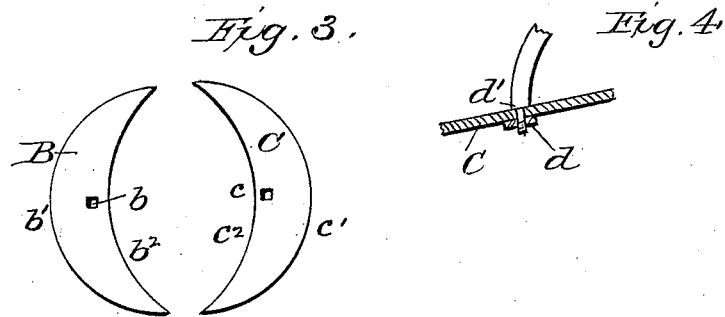
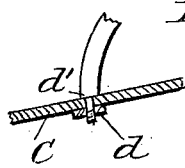
WITNESSES
F. L. Ourand.
W. E. Schneider.
INVENTOR
Harvey Burritt
By L. Deane
his Attorney

UNITED STATES PATENT OFFICE.

HARVEY BURRITT, OF ELK POINT, SOUTH DAKOTA.

HOE.

SPECIFICATION forming part of Letters Patent No. 470,981, dated March 15, 1892.

Application filed February 12, 1891. Serial No. 381,211. (No model.)

*To all whom it may concern:*

Be it known that I, HARVEY BURRITT, a citizen of the United States, residing at Elk Point, in the county of Union and State of South Dakota, have invented certain new and useful Improvements in Hoes; and I do hereby declare the following to be a full, clear, and exact description of the invention, such as will enable others skilled in the art to which it appertains to make and use the same.

Figure 1 is a perspective view of this device. Fig. 2 is a central section at one side of the handle. Fig. 3 is a plan view of the two parts of the hoe or blade detached. Fig. 4 is a detail view showing how the blade is held to the tine.

This device belongs to that class of garden-hoes called "scuffle-hoes;" and the novelty consists in the structure of the blades or two parts of the hoe proper and the device as a whole, all as will now be more fully described and explained, as well as pointed out in the claims.

In the accompanying drawings, A denotes the handle of the device, and B and C the two parts of the blade or hoe proper. These are each of crescent shape, and are so attached to the lower ends of the metal tines $a$ of the handle as to enable them to be placed in line with the handle, so that their concave sides shall be opposite each other. The tines or fingers $a$ are secured at their upper ends in the lower end or shank of the handle A in any usual way, and the ferrule $a'$ is put over this end of the handle outside the ends of the tines.

The attachment of the parts B and C to the ends of the tines can be made in any way desired, so as to hold them rigidly. I have found that by making the holes $b$ and $c$ in each part square and having the ends of the tines square to fit into them and heading the outer ends and putting a nut $d$ on the lower side and having a shoulder $d'$ on the upper side this attachment can be made firm. The advantage of using the nuts $d$ is that if either of the parts of the hoe become loose they can be easily tightened.

The outer edges $b'$ and $c'$ of each part of the hoe are made sharp, so as to cut the grass, weeds, and the like that accumulate about the plants, while the inner edges $b^2$ and $c^2$ are usually dull, though, if desired, these too may be sharpened.

The manner of using this device is so plain and easy to be understood by the gardener as not now to require any lengthy description. It is especially well adapted for ready and effective action about the stem of a growing plant. In any such instance the hoe is so placed in relation to the plant that its stem comes up between the two parts of the hoe. In this position the blunt inner edges will do no harm to the plant, while all about it the weeds and soil can be reached by the sharp outer edges of the two parts. Thus by moving the hoe the entire circumference of the ground about the plant can be worked. That immediately near the plant can be worked by the ends of the parts. As a very effective device for cutting weeds, &c., however located and without change of position by the user or his hold upon the handle, it is not only a very convenient, but a very effective, garden implement.

Having now described my invention, I claim—

1. A hoe having its blade made in two parts, each crescent-shaped and so attached to the handle that the two parts shall have their concave edges or sides toward each other, substantially as described.

2. The herein-described hoe, consisting of the handle A and the two-part blade B C, each part crescent-shaped and having sharpened outer edges and dull inner edges and each rigidly secured to the handle, substantially as shown and described.

In testimony whereof I affix my signature in presence of two witnesses.

HARVEY BURRITT.

Witnesses:
   H. H. CLARK,
   GEO. W. JENKINS.